United States Patent Office 3,525,772
Patented Aug. 25, 1970

3,525,772
PROCESS FOR THE PRODUCTION AND RECOVERY OF N,N-DIMETHYLLAURYLAMINE OXIDE
Jorge R. Muratorio, Buenos Aires, Argentina, assignor to Celanese Corporation, New York, N.Y., a corporation of Delaware
No Drawing. Filed Nov. 1, 1967, Ser. No. 679,634
Int. Cl. C07c *85/16, 87/06*
U.S. Cl. 260—583
6 Claims

ABSTRACT OF THE DISCLOSURE

A process for the production and recovery of N,N-dimethyllaurylamine oxide which comprises reacting N,N-dimethyllaurylamine with peracetic acid in an organic solvent medium whereby the reaction products form an ammonium acetate salt, treating the ammonium acetate salt so as to remove the acetate radical from the salt and recovering a N,N-dimethyllaurylamine oxide solution having good detergent properties.

BACKGROUND OF THE INVENTION

Amine oxides have been known and studied as early as the last decade of the nineteenth century, their importance, however, has only recently been recognized and interest in them stimulated by recognition of their widespread occurrence and possible value in chemotherapeutics, detergents and foam stabilizers. Oxides of long chain tertiary amines have been known to be particularly useful as surface active agents and are of increased value because of their biodegradable character. Especially useful in this regard has been the oxide of N,N-dimethyllaurylamine. Previous attempts to produce this compound have included reacting the corresponding tertiary amine with peracetic acid to yield the tertiary amine oxide and acetic acid. However, because of the weak basicity of the N,N-dimethyllaurylamine oxide thus produced, it readily reacts with the acetic acid to form an ammonium acetate salt, N,N-dimethyllaurylhydroxylammonium acetate, from which it is virtually impossible to remove the acetic acid by conventional means. This inability to remove the acetic acid is of particular importance when the reaction product is intended for use in detergent compositions since the presence of the acetic acid retards the effectiveness of the N,N-dimethyllaurylamine oxide for such a purpose.

SUMMARY OF THE INVENTION

Accordingly, the primary object of the present invention is to provide an improved process for recovering N,N-dimethyllaurylamine oxide from N,N-dimethyllaurylhydroxylammonium acetate salt which ultimately results from the reaction of N,N-dimethyllaurylamine with peracetic acid in an organic solvent medium.

Other objects and advantages of the present invention will be apparent from the following description of the invention.

The above-mentioned objects are accomplished by an improvement in a process for the production and recovery of N,N-dimethyllaurylamine oxide in which N,N-dimethyllaurylamine is reacted with peracetic acid in an organic solvent medium so as to produce N,N-dimethyllaurylamine oxide and acetic acid which readily react together to form the N,N-dimethyllaurylhydroxylammonium acetate salt. The improvement comprises Contacting the N,N-dimethyllaurylhydroxylammonium acetate salt with an inorganic acid to yield acetic acid and the inorganic acid salt of N,N-dimethyllaurylammonium hydroxide, Separately recovering the acetic acid, Contacting the inorganic acid salt of N,N-dimethyllaurylammonium hydroxide with an aqueous slurry of the oxide of an alkaline earth to remove the inorganic acid radical from the N,N-dimethyllaurylammonium hydroxide, thereby yielding N,N-dimethyllaurylamine oxide and a water insoluble inorganic acid salt of the alkaline earth material, and Separately recovering the N,N-dimethyllaurylamine oxide from the water insoluble acid salt and any unreacted alkaline earth oxide.

DETAILED DESCRIPTION OF THE PREFERRED EMBODIMENT

The reaction between N,N-dimethyllaurylamine and peracetic acid may be illustrated as follows:

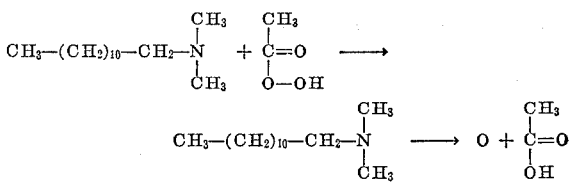

Because of the weak basicity of the N,N-dimethyllaurylamine oxide it readily reacts with the reaction by-product, acetic acid, to produce the N,N-dimethyllaurylhydroxylammonium acetate salt which will sometimes hereinafter be referred to as the ammonium acetate salt. This salt may be illustrated as follows:

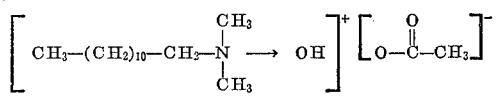

The N,N-dimethyllaurylamine is reacted with the peracetic acid in the presence of an organic solvent, hereinafter more fully defined, at any convenient temperature, for example, a temperature in the range of from about 5 to 35° C., and preferably from about 60 to 65° C. The peracetic acid may be contacted with the amine either as a solution in the organic solvent, e.g., a 15 weight percent solution of peracetic acid in methyl acetate, or as vapors such as obtained from a peracetic acid generator, described in U.S. Pat. No. 3,192,256. The reaction is conducted in any convenient manner such with refluxing. Reaction times of about 5 to 15 minutes are normally sufficient to complete the reaction of the amine with the peracetic acid.

Heretofore it was virtually impossible to remove acetic acid from this above-mentioned ammonium acetate salt by normal distillation procedures. However, according to the present invention the acetic acid may be displaced from the ammonium acetate salt by contacting the salt with at least a stoichiometric amount of an inorganic acid, and preferably with from about 5 to 20 percent in excess of the stoichiometric amount. While larger amounts of the inorganic acid can be used they are economically impractical. The inorganic acid reacts with the ammonium acetate salt to produce the inorganic acid salt of N,N-dimethyllaurylammonium hydroxide and free acetic acid. For example, when sulfuric acid is used as a reagent, it reacts with the ammonium acetate salt to produce the corresponding ammonium sulfate salt and free acetic acid.

Any inorganic acid which does not cause undesirable side reactions may be used such as sulfuric acid, phosphoric acid, iodic acid, selenic acid, and arsenic acid. Preferably, sulfuric or phosphoric acid is used.

Following the displacement of the acetic acid from the ammonium acetate salt, the free acetic acid is separated from the inorganic acid salt in any convenient manner such as by distillation. The organic solvent medium used for the initial oxidation reaction also may be removed or separately recovered from the inorganic acid salt at the same time.

Desirably, the organic solvents used in the present invention are those having a boiling point of less than about 85° C., and preferably methyl acetate. Other suitable solvents are the ketones such as acetone and methyl ethyl ketone; esters such as methyl formate and ethyl formate, ethyl acetate, n-propyl formate; ethers such as di-ethyl ether and di-iso-propyl ether; normally liquid aliphatic or cycloaliphatic hydrocarbons such as n-pentane, n-hexane, cyclohexane; aromatic hydrocarbons such as benzene; alcohols such as methyl alcohol, ethyl alcohol, isopropyl alcohol, tert-butyl alcohol; and acetals such as methylal. As mentioned above the organic solvent may be removed with the freed acetic acid, preferably, however it is distilled from the resulting oxidation reaction mixture before the inorganic acid is added thereto. The organic solvent normally comprises from about 30 to 70 percent by weight of the reaction mixture of amine, peracetic acid and solvent.

In order to free N,N-dimethyllaurylamine oxide from the inorganic acid salt of N,N-dimethyllaurylammonium hydroxide, the inorganic acid salt is contacted with an aqueous slurry of an alkaline earth oxide, the slurry containing at least the stoichiometric amount of alkaline earth oxide necessary to react with the salt. Preferably, 5 to 20 percent above the stoichiometric amount of alkaline earth oxide is used. The acid salt and aqueous slurry are thoroughly mixed whereby a substantially water insoluble inorganic acid salt of the alkaline earth material precipitates from solution and is separated therefrom such as by filtration. For example, when an aqueous slurry of barium oxide is mixed or contacted with N,N-dimethyllaurylammonium sulfate, an ionization reaction occurs to yield substantially water insoluble barium sulfate and an aqueous solution of N,N-dimethylaurylamine oxide. The barium sulfate and any unreacted barium oxide are separated from the aqueous solution of N,N-dimethyllaurylamine oxide as mentioned above by any solid-liquid separation method Any alkaline earth oxide may be used in the present invention, including calcium oxide, barium oxide, and strontium oxide; calcium oxide being preferred.

The reactions of the ammonium acetate salt with the inorganic acid, and the inorganic acid salt with the alkaline earth oxide may be conducted in any convenient manner and at any convenient conditions of temperature and pressure, e.g., 20 to 30° C. and atmospheric pressure.

In a further embodiment of the present invention the oxidation reaction product mixture is neutralized without "springing" the acetic acid through the addition of the inorganic acid. This is accomplished by adding directly to the ammonium acetate salt a 40 to 60 weight percent aqueous solution of an alkali metal basic substance, such as an alkali metal hydroxide or carbonate, until a pH of 7 to 9 is obtained. The alkali metal base reacts with the ammonium acetate salt to yield a water soluble neutral alkali metal acetate salt and N,N-dimethyllaurylamine oxide. The organic solvent is thereafter removed by conventional methods, such as by distillation.

Surprisingly, the neutral alkali metal acetate salt may be permitted to remain in solution with the N,N-dimethyllaurylamine oxide without any adverse effects on the foaming or detergent properties of the amine oxide.

Suitable alkali metal basic materials that may be used in the present invention are those which form water soluble neutral salts with the ammonium acetate salt. Typical of such bases are alkali metal hydroxides such as lithium hydroxide, sodium hydroxide and potassium hydroxide, as well as carbonates of the same alkali metals. The alkali metal base may be reacted with the ammonium acetate salt at any convenient conditions of temperature and pressure, such as 20 to 30° C. and atmospheric pressure.

The invention is additionally illustrated by the following examples.

Example 1

Eighteen grams of peracetic acid dissolved in 62 grams of methyl acetate were added dropwise with stirring to 35 grams of N,N-dimethyllaurylamine and allowed to react therewith by refluxing at atmospheric pressure and 65° C. The reaction was completed when all of the peracetic acid was added. The N,N-dimethyllaurylamine oxide and the by-product acetic acid formed a salt, dimethyllaurylhydroxylammonium acetate. The methyl acetate solvent was then removed by allowing it to evaporate in a Rota film evaporator and trapped in a Dry Ice trap. Thereafter, 8.4 grams of dilute (20%) sulfuric acid was added to the essentially organic solvent free product mixture to displace acetic acid from the ammonium acetate salt, thereby forming an aqueous solution of N,N-dimethyllaurylhydroxylammonium sulfate and free acetic acid.

The acetic acid was distilled from the resulting aqueous solution and a 50 percent by weight aqueous slurry of calcium oxide was then added to the solution with strong agitation. Water insoluble calcium sulfate which formed as a result of the reaction, along with the unreacted calcium oxide, were separated from the resulting amine oxide by filtration. 34.6 grams of N,N,-dimethyllaurylamine oxide was recovered in the aqueous mother liquid representing a yield of 99 percent.

The foaming properties of the resulting N,N-dimethyllaurylamine oxide were tested by preparing a 5 percent solution of the amine oxide in water following by shaking for 3 minutes. The foam stability was excellent and detergent power good.

Example 2

Thirty-eight grams of peracetic acid dissolved in 215.3 grams of methyl acetate were added dropwise with stirring to 106.7 grams of N,N-dimethyllaurylamine and allowed to react by refluxing at atmospheric pressure and 62° C. As in Example 1, the reaction was completed when all the peracetic acid was added. No heating was required, and the reaction products formed the ammonium acetate salt. The methyl acetate solvent was similarly removed by evaporation in a rotary film evaporator and trapped in a Dry Ice trap. The reaction mixture was then neutralized by the addition of a 50 percent by weight aqueous solution of sodium hydroxide until a pH of 8.5 was reached. Analysis of the neutralized solution showed 31.7 weight percent of N,N-dimethyllaurylamine oxide present therein. The sodium acetate resulting from neutralization of the product mixture was allowed to remain in solution.

The foaming properties of the resulting N,N-dimethyllaurylamine oxide were tested by preparing a 5 percent solution of the amine oxide in water followed by shaking for 3 minutes. The foam stability was excellent and detergent power good.

I claim:

1. In a process for the production and recovery of N,N-dimethyllaurylamine oxide wherein N,N-dimethyllaurylamine is reacted with peracetic acid in an organic solvent medium to produce N,N-dimethyllaurylamine oxide and acetic acid, which react together and remain in solution as the N,N-dimethyllaurylhydroxylammonium acetate salt, the improvement which comprises:

contacting the N,N-dimethyllaurylhydroxylammonium acetate salt with an inorganic acid selected from the group consisting of sulfuric acid, phosphoric acid, iodic acid, selenic acid and arsenic acid to yield acetic acid and the corresponding inorganic acid salt of N,N-dimethyllaurylammonium hydroxide;

separately recovering the organic solvent and acetic acid, contacting the inorganic acid salt of N,N-dimethyllaurylammonium hydroxide with an aqueous slurry of an alkaline earth oxide to remove the inorganic acid radical from the N,N-dimethyllaurylammonium hydroxide thereby yielding N,N-dimethyllaurylamine oxide and a water insoluble inorganic acid salt of the alkaline earth material; and separating the water insoluble inorganic acid salt of the alkaline earth oxide and any unreacted alkaline earth oxide from the resulting aqueous solution of the amine oxide.

2. The process of claim 1, wherein the organic solvent has a boiling point of less than about 85° C.; at least a stoichiometric amount of the inorganic acid is contacted with the ammonium acetate salt; and at least a stoichiometric amount of the alkaline earth oxide is contacted with the inorganic acid salt.

3. The process of claim 2, wherein the organic solvent medium is removed prior to the addition of the inorganic acid.

4. The process of claim 3, wherein the organic solvent medium is methyl acetate.

5. The process of claim 4, wherein 5 to 20 percent above the stoichiometric amount of sulfuric acid is contacted with the ammonium acetate salt, and 5 to 20 percent above the stoichiometric amount of calcium oxide is contacted with the resulting ammonium sulfate salt.

6. In a process for the production and recovery of N,N-dimethyllaurylamine oxide wherein N,N-dimethyllaurylamine is reacted with peracetic acid in the presence of methyl acetate to produce N,N-dimethyllaurylamine oxide and acetic acid, which react together and remain in solution in the methyl acetate as the N,N-dimethyllaurylhydroxylammonium acetate salt, the improvement which comprises, separating the ammonium acetate salt from the methyl acetate by distillation, contacting the essentially solvent free N,N-dimethyllaurylhydroxylammonium acetate salt with 5 to 20 percent above the stoichiometric amount of sulfuric acid, the sulfuric acid being added as an aqueous solution, to yield acetic acid and an aqueous solution of N,N-dimethyllaurylhydroxylammonium sulfate, separately recovering the acetic acid by distillation, contacting the resulting aqueous solution of N,N-dimethyllaurylhydroxylammonium sulfate salt with 5 to 20 percent above the stoichiometric amount of calcium oxide, the calcium oxide being added as an aqueous slurry, thereby yielding water insoluble calcium sulfate and N,N-dimethyllaurylamine oxide, and separating the water insoluble calcium sulfate and unreacted calcium oxide from the aqueous amine oxide solution by filtration.

References Cited

Y 109, February 1956, Germany, Ishidate et al.

CHARLES B. PARKER, Primary Examiner

R. L. RAYMOND, Assistant Examiner